(12) United States Patent
Suen et al.

(10) Patent No.: US 8,665,155 B2
(45) Date of Patent: Mar. 4, 2014

(54) EMERGENCY RESCUE SYSTEM AND RESCUE-INFORMATION JUDGMENT METHOD

(75) Inventors: Tain-Wen Suen, Longtan Shiang (TW); Jen-Chi Liao, Xinzhuang (TW); Feng-Yu Chang, Kaohsiung (TW); Yu-Shan Lin, Longtan Shiang (TW)

(73) Assignee: Chung-Shan Institute of Science and Technology, Armaments Bureau, Ministry of National Defense, Taoyuan County (TW)

( * ) Notice: Subject to any disclaimer, the term of this patent is extended or adjusted under 35 U.S.C. 154(b) by 716 days.

(21) Appl. No.: 12/633,788

(22) Filed: Dec. 8, 2009

(65) Prior Publication Data

US 2011/0133989 A1 Jun. 9, 2011

(51) Int. Cl.
*G01S 3/02* (2006.01)
(52) U.S. Cl.
USPC ............................................ 342/463
(58) Field of Classification Search
USPC .................................. 342/451, 463
See application file for complete search history.

(56) References Cited

U.S. PATENT DOCUMENTS

| 2003/0043073 | A1* | 3/2003 | Gray et al. ..................... 342/465 |
| 2005/0206555 | A1* | 9/2005 | Bridgelall et al. ............. 342/127 |
| 2006/0071854 | A1* | 4/2006 | Wilcox ........................ 342/458 |
| 2006/0290519 | A1* | 12/2006 | Boate et al. ................. 340/573.4 |
| 2011/0148602 | A1* | 6/2011 | Goh et al. ................... 340/10.41 |
| 2011/0223874 | A1* | 9/2011 | Callaway et al. .......... 455/115.3 |

OTHER PUBLICATIONS

Wikipedia article, "Network Topology", Dec. 6, 2008 version.*
Health Watch, Inc. web page, "Equipment", Jan. 24, 2009 version.*
Wikipedia article, "Enhanced 9-1-1", Nov. 21, 2008 version.*
Wikipedia article, "Trilateration", Dec. 5, 2008 version.*
Riccardo Masiero, "RSSI Based Tracking Algorithms for Wireless Sensor Networks: Theoretical Aspects and Performance Evaluation", 2007.*
Lau et al., "Enhanced RSSI-Based High Accuracy Real-Time User Location Tracking System for Indoor and Outdoor Environments", International Journal on Smart Sensing and Intelligent Systems, vol. 1, No. 2, Jun. 2008.*
EW and Radar Systems Engineering Handbook, "One-Way Radar Equation/RF Propagation", p. 4-3.1, Apr. 1, 1997.*

* cited by examiner

*Primary Examiner* — Harry Liu

(57) ABSTRACT

An emergency rescue system and a rescue-information judgment method are disclosed. The emergency rescue system includes a plurality of fixed nodes, a dynamic node and a back-end processing platform. Each fixed node has its own fixed node identification. The dynamic node can be a portable device with an emergency illumination module. If the dynamic node is manipulated to broadcast a mayday signal, at least one of the fixed nodes senses the mayday signal. Each fixed node which senses the mayday signal sends the fixed node identification thereof and signal strength of the sensed mayday signal to the back-end processing platform. Thereby, the back-end processing platform calculates and determines a rescue location relative to the dynamic node.

5 Claims, 6 Drawing Sheets

EMERGENCY RESCUE SYSTEM AND RESCUE-INFORMATION JUDGMENT METHOD

BACKGROUND OF THE INVENTION

1. Field of the Invention

This invention relates to an emergency rescue system and more particularly relates to an emergency rescue system and a rescue-information judgment method applied thereto.

2. Description of the Prior Art

In the present high-developed metropolises, there are tall buildings and the population concentrates high. Every public place, such as office buildings, shopping bazaars, movie theaters, playing fields etc., is often crowded by people. Once an emergency, such as fire in a building, earthquake, even terror attack etc., occurs in such an area with the concentration of population, thousands of people may lead to incalculable damage. Therefore, the present laws or rules of architecture include articles that fire apparatus and indicant thereof must be disposed at public places in order to protect lives and properties of people.

For example, there are emergency illuminators disposed at a normal public place. If a fire or a heavy danger occurs so that buildings lose power, people could take the emergency illuminators to flee for life or move to safe place for rescue.

However, unless the object for rescue knows to send a mayday message in certain means (such as broadcasting the mayday signal by a radio), the whole emergency rescue action cannot exploit the most effect in general. Rescuers cannot find out the location where the object for rescue is from the first in general. For the most cases, the rescuers need to rely on experience to search the object for rescue by floor and by room, even execute searching and relieving, which loses the prime time for rescue.

The current method of sending mayday signals is to attract the notice of the rescuers mainly by voices, radio (such as the MAYDAY message in accordance with the radio standard) or light (such as SOS signal by long-and-short bright-and-dark lighting). However, these mayday signals are applied to the large-area rescue actions in the broad sea, outdoors, mountains, not to the complex passages and the partition structures inside the current tall buildings.

The invention discloses an emergency rescue system and a rescue-information judgment method, which collect location information relative to the object for rescue for the rescue organization to seize the location where the object is instantly.

SUMMARY OF THE INVENTION

A scope of the invention is to provide an emergency rescue system.

According to an embodiment, the emergency rescue system includes a plurality of fixed nodes, at least one dynamic node, and a back-end processing platform. Each of the fixed nodes has a fixed node identification. Each of the at least one dynamic node could be a portable mayday device with an emergency illumination module. The dynamic node is manipulated to broadcast a mayday signal. The back-end processing platform is connected in communication to the fixed nodes. If one of the at least one dynamic node broadcasts the mayday signal, at least one of the fixed nodes senses the mayday signal. Therein, each of the fixed nodes which sense the mayday signal sends the fixed node identification thereof and signal intensity of the sensed mayday signal to the back-end processing platform. The back-end processing platform thereby calculates and determines a rescue location relative to the dynamic node.

Another scope of the invention is to provide a rescue-information judgment method applied to an emergency rescue system which includes a plurality of fixed nodes, a dynamic node, and a back-end processing platform. The back-end processing platform is connected in communication to the fixed nodes.

According to an embodiment, the rescue-information judgment method includes the following steps of:

(a) broadcasting a mayday signal by the dynamic node;

(b) sensing the mayday signal by the fixed nodes, wherein at least one of the fixed nodes senses the mayday signal;

(c) sending an individual fixed node identification and signal intensity of the sensed mayday signal to the back-end processing platform by each of the fixed nodes sensing the mayday signal; and (d) calculating and determining a rescue location relative to the dynamic node by the back-end processing platform.

In the above emergency rescue system, each of the dynamic node is a portable mayday device which includes an emergency illumination module, a power module, a mayday button, and a wireless transmission module. The power module is used for supplying power to the emergency illumination module. If the mayday button is manipulated, the portable mayday device through the wireless transmission module broadcasts the mayday signal.

Compared with the emergency illuminator with functions of storage and illumination only in the prior art, the emergency rescue system of the invention, each of the dynamic nodes could illuminate and broadcast the mayday signal respectively to the fixed nodes. The back-end processing platform could collect the information relative to the mayday signal from all of the fixed nodes which sense the mayday signal. The rescue organization thereby could seize the locations where all objects for rescue are by the back-end processing platform so as to perform the most efficient rescue action.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
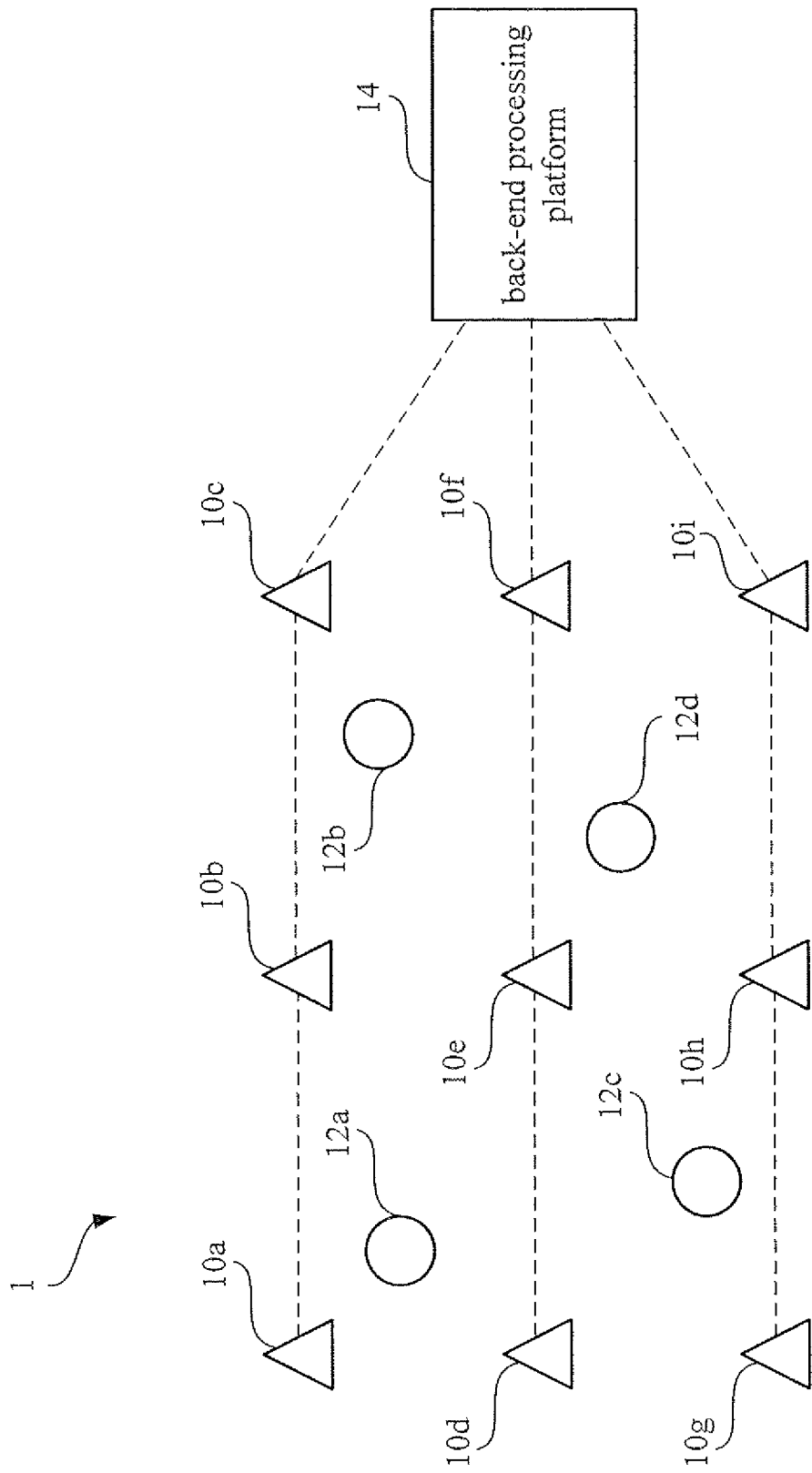
FIG. 1 is a schematic diagram illustrating an emergency rescue system according to an embodiment of the invention.

Please refer to FIG. 1. FIG. 1 is a schematic diagram illustrating an emergency rescue system 1 according to an embodiment of the invention. As shown in FIG. 1, the emergency rescue system 1 includes a plurality of fixed nodes (nine fixed nodes 10a~10i, for example, shown in FIG. 1), at least one dynamic node (four dynamic nodes 12a~12d, for example, shown in FIG. 1), and a back-end processing platform 14.

The fixed nodes 10a~10i respectively could be a fixed wireless sensing device. The wireless sensing devices could be distributed at every corner of a building, such as walls of every elevator shaft of each floor, courtyard, washroom, doorway etc. or other places conducive to installation. The wireless sensing devices (i.e. fixed nodes) respectively include a wireless transmission module for sensing mayday signals from the dynamic nodes 12a~12d. The detailed manipulation principle will be described in detail later. Each of the fixed nodes 10a~10i has a serial number as the individual fixed node identification for identifying, such as ID001, ID002 to ID009. In practical applications, the hardware architecture of the fixed nodes 10a~10i is similar to the wireless access points (Wireless APs) in the market.

Each of the wireless sensing devices (the fixed nodes 10a~10i) is connected in communication through physical cables or wireless transmission to the back-end processing platform 14 or another one of the wireless sensing device. The dashed lines in FIG. 1 present the communication connection between the nodes. Thereby, each of the wireless sensing devices (the fixed nodes 10a~10i) is able to communicate or exchange information with the back-end processing platform 14 directly or indirectly. For example, the fixed node 10c is directly connected to the back-end processing platform 14; however, the invention is not limited to this. In the allowance of the transmission environment, the fixed node 10e could be directly connected to the back-end processing platform 14 too.

As shown in FIG. 1, the back-end processing platform 14 and the wireless sensing devices (the fixed nodes 10a~10i) are connected in communication in form of a tree topology; however, the invention is not limited to this. The back-end processing platform 14 and the wireless sensing devices (the fixed nodes 10a~10i) could be connected in communication alternatively in form of a bus topology, a star topology, a ringed topology, or a net topology. The various network topologies and architectures and principles thereof are well-known by persons in the field of the prior art. It will not be described additionally.

Figure 2:
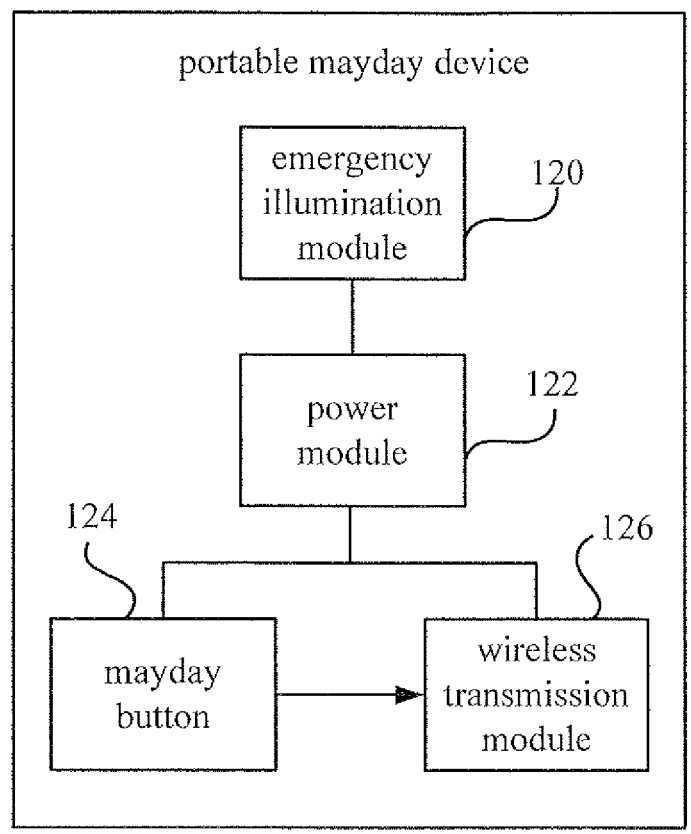
FIG. 2 is a function block diagram of a portable mayday device according to an embodiment of the invention.

Please refer to FIG. 2. FIG. 2 is a function block diagram of a portable mayday device according to an embodiment of the invention. Each of the dynamic nodes 12a~12d respectively is a portable mayday device which includes an emergency illumination module 120, a power module 122, a mayday button 124, and a wireless transmission module 126. The power module 122 is used for supplying power to the emergency illumination 120. Once an emergency occurs, a user could take portable mayday devices (i.e. the dynamic nodes 12a~12d) hung on the wall or disposed at noticeable places nearby and then use the portable mayday devices to supply illumination. In another aspect, the user could manipulate the mayday button 124 to drive the portable mayday device to broadcast a mayday signal through the wireless transmission module 126.

Figure 3:
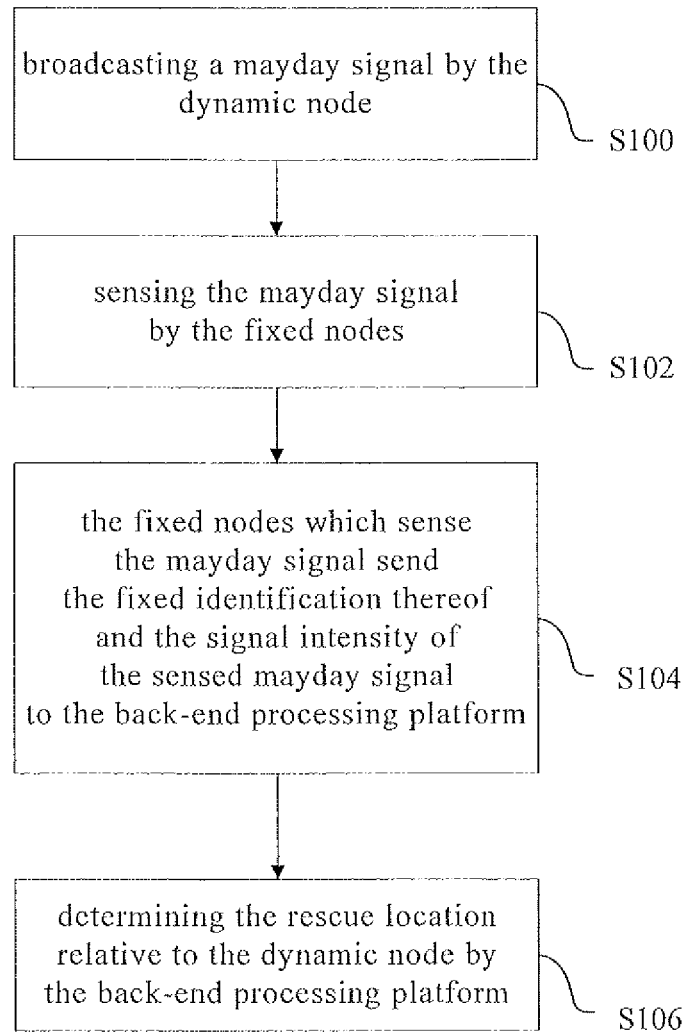
FIG. 3 is a flow chart of a rescue-information judgment method according to an embodiment of the invention.

Please refer to FIG. 3 together. FIG. 3 is a flow chart of a rescue-information judgment method according to an embodiment of the invention. In this embodiment, the rescue-information judgment method could be applied to the emergency rescue system 1 in FIG. 1; however, the invention is not limited to this.

Figure 4A:
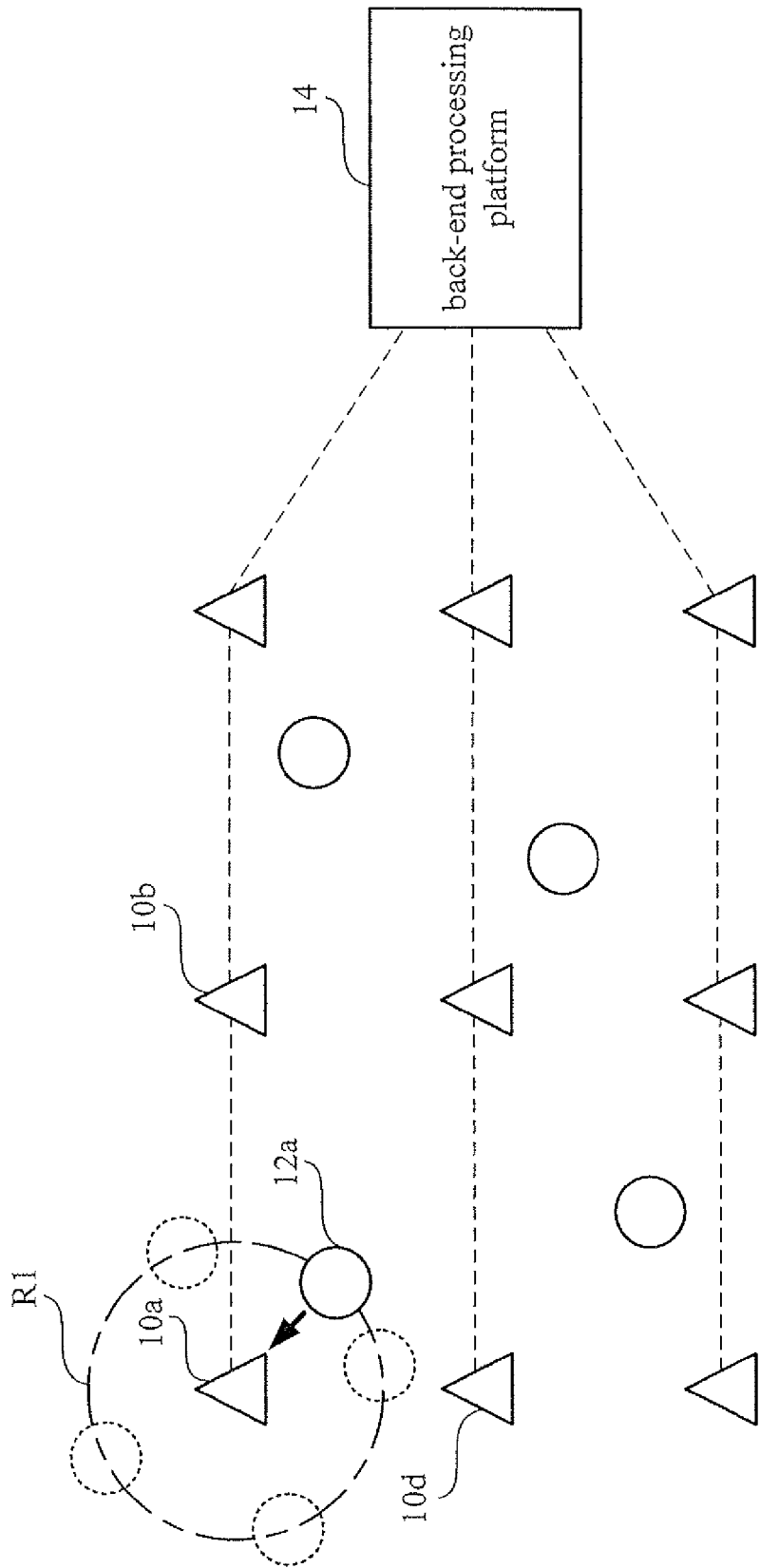
FIG. 4A is a schematic diagram illustrating an operation example of the rescue-information judgment method and the emergency rescue system 1 according to an embodiment of the invention.

As shown in FIG. 3, once an emergency occurs, the user could press the mayday button 124 of the portable mayday devices (i.e. the dynamic nodes 12a~12d) to perform the step S100 of broadcasting a mayday signal by the dynamic nodes. Please refer to FIG. 4A together. FIG. 4A is a schematic diagram illustrating an operation example of the rescue-information judgment method and the emergency rescue system 1 according to an embodiment of the invention. As shown in FIG. 4A, at this time, the user manipulates the dynamic node 12a to broadcast a mayday signal (schematically shown by an arrow).

The step S102 is then performed by sensing the mayday signal by the fixed nodes 10a~10i. Therein, at least one of the fixed nodes 10a~10i near the dynamic node 12a senses the mayday signal. As shown in FIG. 4A, the fixed node 10a, for example, senses the mayday signal.

Afterwards, the step S104 is performed by the fixed nodes which sense the mayday signal (i.e. the fixed node 10a in the embodiment) sending the fixed node identification thereof and the signal intensity of the sensed mayday signal respectively to the back-end processing platform 14.

At last, the step S106 is performed by the back-end processing platform 14 calculating and determining the rescue location relative to the dynamic node 12a which has broadcasted the mayday signal and is waiting for rescue.

For the example in FIG. 4A, in the step S106, the detailed method of the back-end processing platform calculating and determining the rescue location further includes: if the fixed node 10a senses the mayday signal, according to the signal intensity sent by the fixed node 10a, the back-end processing platform 14 calculates the distance between the dynamic node 12a and the fixed node 10a on a basis of an algorithm. The algorithm would be the following formula:

$$P_r = \frac{P_t G_t}{4\pi R^2} \times A_e \times G_r;$$

therein, $P_r$ presents the received return energy, $P_t$ presents the irradiation energy, $G_t$ presents the gain of irradiation, R presents the distance between the dynamic node and the fixed node, $A_s$ presents the efficient area of the receiving antenna of the fixed node, and $G_r$ presents the sum of the loss of the receiver of the fixed node, the gain of signal processing, and the loss of system.

After the calculation of the distance R between the dynamic node and the fixed node through the above algorithm, a ringed candidate location R1 relative to a center of the fixed node 10a (as shown in FIG. 4A) where the dynamic node may be located is determined according to the distance R. In this example, the generated ringed candidate location R1 by the sensing of the single fixed node could shrink the possible area relative to the dynamic node 12a; however, the dynamic node may be at any position within the ringed candidate location R1. For example, other positions shown in dashed circles are also possible.

Figure 4B:
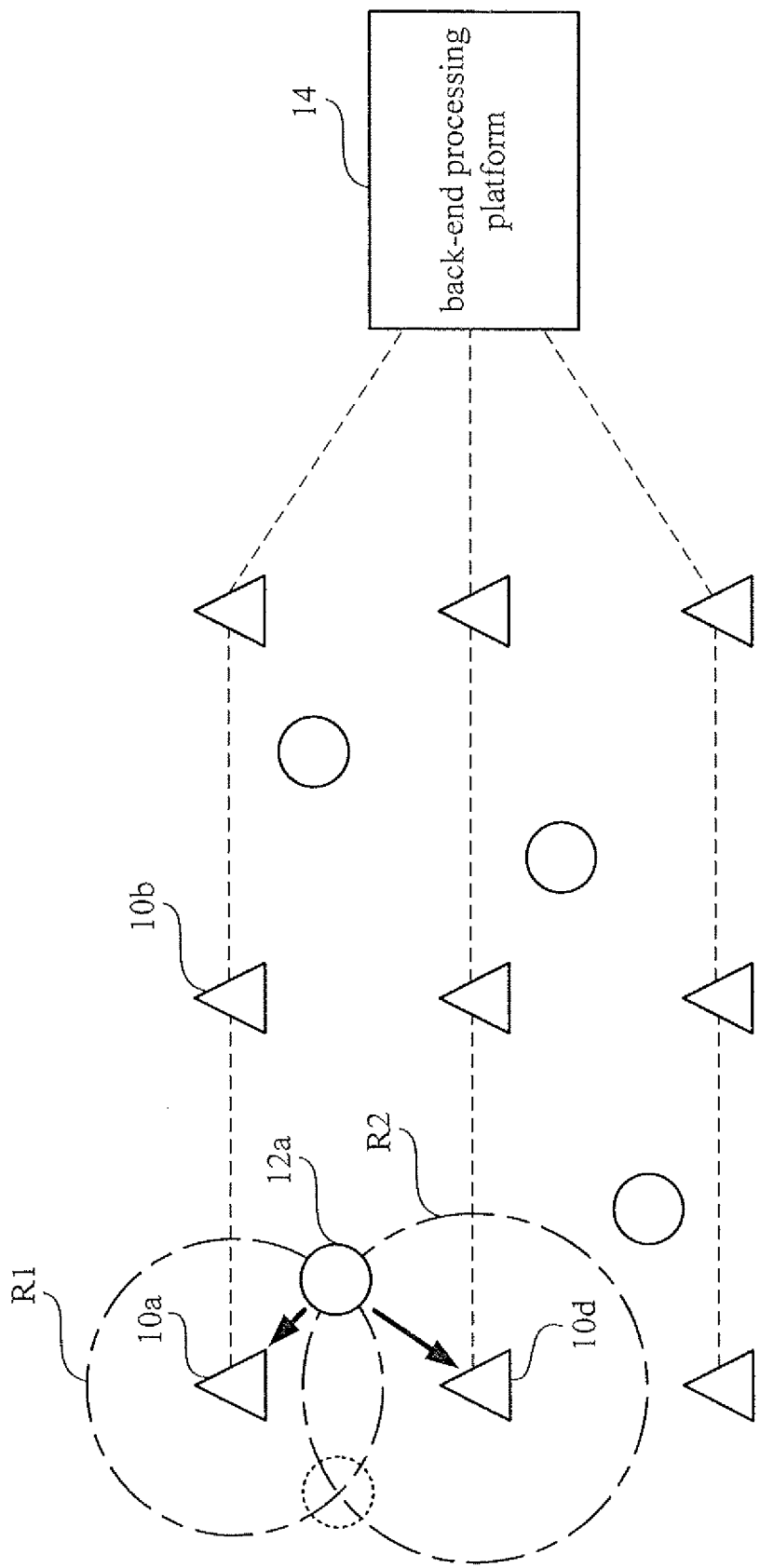
FIG. 4B and FIG. 4C are respectively schematic diagrams of different operation examples according to the rescue-information judgment method and the emergency rescue system.
Figure 4C:
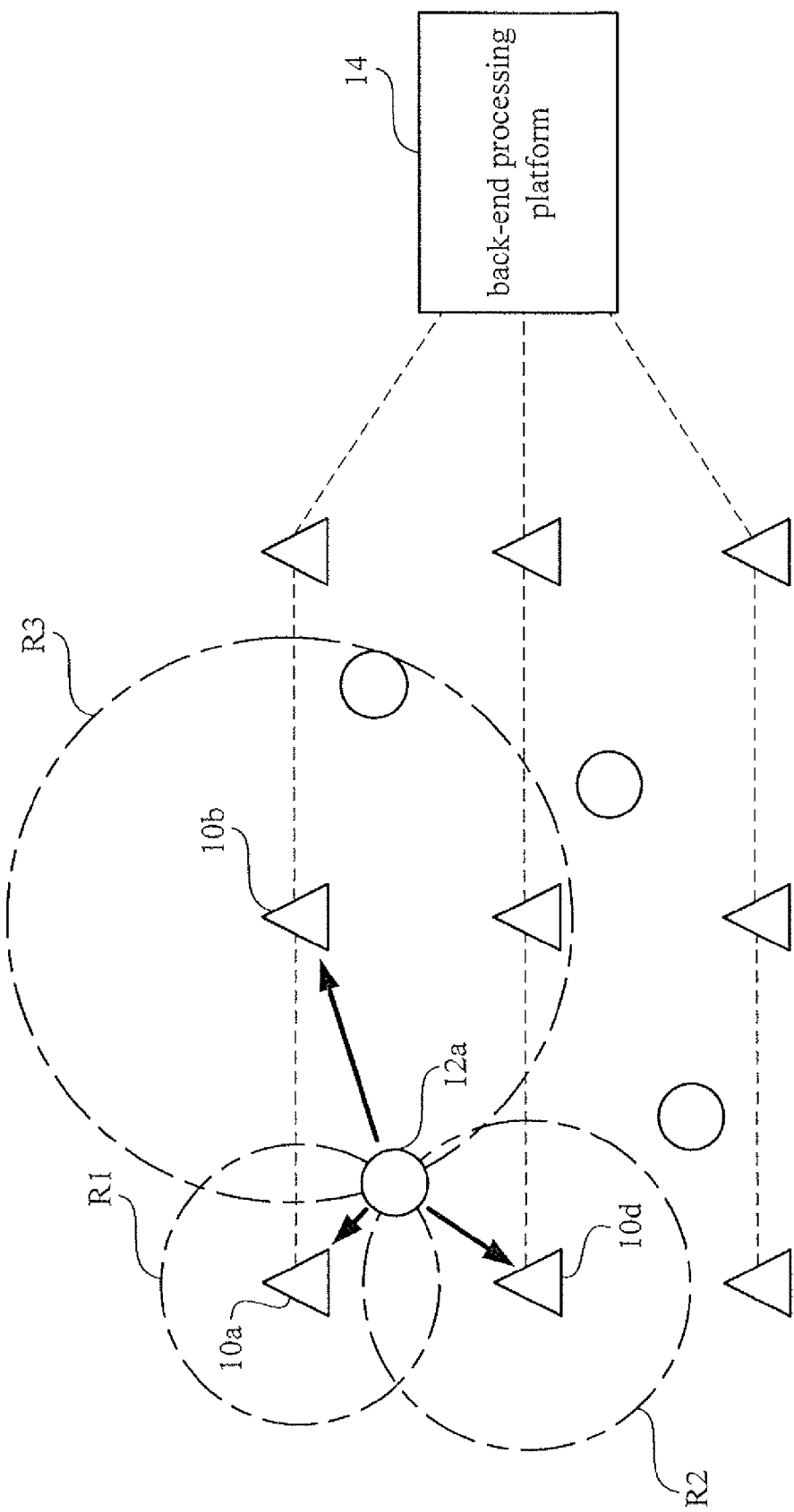

The operation example in FIG. 4A shows the case of single fixed node sensing the mayday signal; however, the invention is not limited to this. Please refer to FIG. 4B and FIG. 4C together. FIG. 4B and FIG. 4C are respectively schematic diagrams of different operation examples according to the rescue-information judgment method and the emergency rescue system 1.

In the operation example in FIG. 4B, there are two fixed nodes 10a and 10d sensing the mayday signal sent by the dynamic node 12a in the step S102. Then, the fixed nodes 10a and 10d send information to the back-end processing module 14. The back-end processing module 14 performs calculating according to the information sent by the fixed nodes 10a and 10*d*. The back-end processing module 14 calculates the distances between the fixed nodes and the dynamic node respectively according to the signal intensities sensed by the fixed nodes, and then determines two ringed candidate locations R1 and R2. Afterward, the back-end processing platform 14 further calculates two union candidate locations on the basis of a union of the two ringed candidate locations R1 and R2, as shown in FIG. 4B. Compared with the determination for single fixed node, the back-end processing platform 14 in this example could determine the rescue location relative to the dynamic node 12*a* more precisely.

In another aspect, for the operation example in FIG. 4C, there are three fixed nodes 10*a*, 10*d* and 10*b* sensing the mayday signal sent by the dynamic node 12*a* in the step S102. At last, there are three ringed candidate locations R1, R2 and R3 in FIG. 4C. The determination for the rescue location relative to the dynamic node 12*a* could be more precisely determined by calculating on the basis of the union of three or more ringed candidate locations. In addition, if the rescue location is determined, the back-end processing platform could track the rescue location by following the sensed mayday signal, no matter how many fixed nodes sensing the mayday signal have been updated. The above tracking makes the rescue location more constantly and precisely even if the fixed nodes sensing the mayday signal update poorly.

As discussed above, in the emergency rescue system of the invention, the dynamic nodes could respectively be used for illumination and broadcasting a mayday signal to the fixed nodes. The back-end processing platform could collect all information relative to the mayday signal from the fixed nodes. Thereby, the rescue organization could seize the locations relative to objects for rescue through the back-end processing platform, so as to perform the most efficient rescue action.

With the example and explanations above, the features and spirits of the invention will be hopefully well described. Those skilled in the art will readily observe that numerous modifications and alterations of the device may be made while retaining the features and spirit of the invention. Accordingly, the above disclosure should be construed as limited only by the metes and bounds of the appended claims.

What is claimed is:

1. An emergency rescue system, modularly implemented as a transmitter, a receiver-transmitter, and a processor, comprising
   1) at least one dynamic node, as a transmitter inapplicable to receiving nor processing signals, portably implemented for broadcasting only one mayday signal of a fixed signal intensity,
   2) no more than one set of m fixed nodes dispensing with a threshold for signal intensity, as receiver-transmitters inapplicable to processing signals, each with an individual fixed node identification, physically scattered in lines parallel to each other, with said at least one dynamic node interspersed in between said lines,
   wherein upon sensing said mayday signal, n out of m fixed nodes, $1 \leq n \leq m$, denoted respectively as a $1^{st}$ fixed node, a $2^{nd}$ fixed node, . . . to an $n^{th}$ fixed node, send said signal intensity along with said individual fixed node identification to a back-end processing platform, and
   3) said back-end processing platform, separately located away from said fixed nodes:
   3.I) for each said $n^{th}$ fixed node:
   obtaining a value of R from the following calculation, $$R=((Pt \cdot Gt \cdot Ae \cdot Gr)/(4\pi \cdot Pr))^{1/2}$$

$$\left(\text{derived from } P_r = \frac{P_t G_t}{4\pi R^2} \times A_e \times G_r\right)$$

$P_r$ is an received return energy,
   $P_t$ is an irradiation energy,
   $G_t$ is a gain of irradiation,
   $A_e$ is an efficient area of a receiving antenna of the fixed node,
   $G_r$ is sum of a loss of a receiver of the fixed node, a gain of signal processing, and a loss of system;
   3.II) for said value of R obtained from step I) for said $n^{th}$ fixed node:
   generating a ring $R_n$ of multiple candidate locations with a diameter of R to a center of said $n^{th}$ fixed node, such that a ring R1 is generated for said $1^{st}$ fixed node, a ring $R_2$ is generated for said $2^{nd}$ fixed node, etc; and
   3.III) locating number of rescue locations relative to the dynamic node by intersecting ring $R_1$ to ring $R_n$, wherein said number of rescue locations decreases with an increase of n.

2. The emergency rescue system as claimed in claim 1, wherein said fixed node is a wireless sensing device comprising a wireless transmission module.

3. The emergency rescue system as claimed in claim 2, wherein said wireless sensing device is connected with a cable to said back-end processing platform or another wireless sensing device.

4. The emergency rescue system as claimed in claim 1, wherein said back-end processing platform and the fixed nodes are communicated in a tree topology, a bus topology, a star topology, a ringed topology, or a net topology.

5. The emergency rescue system as claimed in claim 1, wherein said dynamic node comprises a emergency illumination module, a power module, a mayday button, and a wireless transmission module.

\* \* \* \* \*